United States Patent
Suzuki

(10) Patent No.: US 6,891,970 B1
(45) Date of Patent: May 10, 2005

(54) IMAGE PROCESSING APPARATUS AND METHOD

(75) Inventor: Takayuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 09/714,277

(22) Filed: Nov. 17, 2000

(30) Foreign Application Priority Data

Nov. 18, 1999 (JP) .......................................... 11-328491
Nov. 14, 2000 (JP) ..................................... 2000-347024

(51) Int. Cl.[7] .............................................. G06K 9/00
(52) U.S. Cl. ..................................................... 382/167
(58) Field of Search ................................ 382/154, 285, 382/286, 293, 294, 295, 296, 297, 298; 345/419, 427, 473, 474, 501, 522, 530, 531, 582, 583

(56) References Cited

U.S. PATENT DOCUMENTS

| | | | | |
|---|---|---|---|---|
| 5,687,303 A | * | 11/1997 | Motamed et al. ........... | 358/1.18 |
| 5,790,130 A | * | 8/1998 | Gannett ....................... | 345/587 |
| 5,793,386 A | * | 8/1998 | Larson et al. ............... | 345/553 |
| 5,870,509 A | * | 2/1999 | Alcorn ........................ | 382/293 |
| 6,091,422 A | * | 7/2000 | Ouaknine et al. ........... | 345/419 |
| 6,304,271 B1 | * | 10/2001 | Nehme ........................ | 345/620 |
| 6,493,099 B2 | * | 12/2002 | Nakagiri ..................... | 358/1.13 |
| 6,570,578 B1 | * | 5/2003 | Smirnov et al. ............ | 345/629 |

FOREIGN PATENT DOCUMENTS

JP          2000-13622          4/2000          ............ H04N/1/60

* cited by examiner

Primary Examiner—Jose L. Couso
(74) Attorney, Agent, or Firm—Fitzpatrick, Cella, Harper & Scinto

(57) ABSTRACT

When rendering commands of objects obtained by segmenting a source image are issued, since these segmented objects cannot undergo an identical correction process based on the color distribution of the source image, an image with poor image quality is often obtained in place of an image with high image quality. Hence, the type of object to be rendered is discriminated (S40), it is checked if the object of interest is to undergo the correction process (S50, S70), and segmented objects obtained by segmenting a single image together with the object which is determined to undergo the correction process are searched for (S90). If the segmented objects are found, the correction characteristics of the correction process are determined on the basis of the characteristics of these segmented objects (S140).

18 Claims, 11 Drawing Sheets

FIG. 5

| IDENTIFICATION NUMBER | USE FLAG | CORRECTION INFORMATION REGION ADDRESS |
|---|---|---|
| 1 | FALSE | NULL |
| 2 | FALSE | NULL |
| 3 | FALSE | NULL |
| ⋮ | ⋮ | ⋮ |
|  |  |  |
| 255 | FALSE | NULL |

FIG. 7

| IDENTIFICATION NUMBER | USE FLAG | CORRECTION INFORMATION REGION ADDRESS |
|---|---|---|
| 1 | TRUE | 1 |
| 2 | FALSE | NULL |
| 3 | FALSE | NULL |
| ⋮ | ⋮ | ⋮ |
|   |   |   |
| 255 | FALSE | NULL |

FIG. 9

| IDENTIFICATION NUMBER | USE FLAG | CORRECTION INFORMATION REGION ADDRESS |
|---|---|---|
| 1 | TRUE | 1, 2, 3 |
| 2 | TRUE | 1, 2, 3 |
| 3 | TRUE | 1, 2, 3 |
| ⋮ | ⋮ | ⋮ |
|  |  |  |
| 255 | FALSE | NULL |

FIG. 10

IMAGE PROCESSING APPARATUS AND METHOD

FIELD OF THE INVENTION

The present invention relates to an image processing apparatus and method and, more particularly, to an image processing apparatus and method for rendering an image on the basis of a rendering command.

BACKGROUND OF THE INVENTION

Upon outputting a high-quality image based on image data via a printer or display, a plurality of objects that form the image must undergo color processes such as color correction, color conversion, binarization, and the like in correspondence with the types of objects.

In general, upon printing or displaying on a display device an image created by application software, rendering commands from the application software are imaged by a device driver (or device itself) of a printer or display device to create image data to be printed or displayed for the entire page. Rendering commands that form a document include, e.g., an image rendering command corresponding to a photo image portion, a text rendering command corresponding to a text portion, and a graphic rendering command corresponding to a graphic portion. Such rendering commands are issued to the device driver, which execute color processes suitable for individual objects in units of types of commands, thus converting the commands into an image that an output device can output.

Upon conversion, color matching processes are switched so that graphics, text, and photo portions respectively undergo "saturation", "calorimetric", and "perceptual" processes, and an image in which all objects on the entire page have high image quality can be obtained.

In recent years, some system or application software designates a "source color space" of each object, and the device driver can obtain a high-quality output image using the designated contents. For example, when a scanner input image is pasted onto a document, the image rendering command of that image can designate a color profile which describes the device characteristics of a scanner, or a color profile that describes the characteristics of a monitor used to reproduce colors observed by the editor upon color calibration on the display. Such color profiles are, for example, International Color Consortium (ICC) profiles, and Image Color Matching (ICM) of Windows®95 available from Microsoft Corp., ColorSync of Apple Computer, and the like are known as systems that can use such profiles.

In order to implement the aforementioned image processes, upon printing even an image that the user recognizes as a single image, application software or an operating system often issues a plurality of rendering commands. In this case, whether or not rendering commands corresponding to a plurality of segmented images can be combined is checked by comparing apex coordinate information of rectangular regions as rendering regions of the respective rendering commands corresponding to the plurality of segmented images, as described in Japanese Patent Laid-Open No. 2000-13622.

For example, as shown in FIG. 1, when one image is issued as two image rendering commands, since the lower left apex of rectangular region 1-A of the first rendering command neighbors the upper left apex of rendering region 1-B of the second rendering command, and the lower right apex of rectangular region 1-A also neighbors the upper right apex of rectangular region 1-B, it is determined that images to be rendered by the two rendering commands can be combined.

Recent application software normally has a function of cutting image data into an arbitrary shape. When an image cut using this function is to be printed, a plurality of image rendering commands are issued.

For example, as shown in FIG. 2, these image rendering commands are issued to be segmented into rectangular regions 2-A, 2-B, 2-C, 2-D, and 2-E. When the image is segmented, as shown in FIG. 2, the aforementioned method of checking by comparing apex coordinate information of these rectangular regions if rendering commands corresponding to a plurality of segmented images can be combined cannot determine whether all five image rendering commands corresponding to these cut (segmented) images can be combined. For this reason, these segmented images cannot undergo an identical correction process on the basis of the characteristics (e.g., color distribution) of an image that the user recognizes as a single image, and an image with poor image quality is obtained in place of that with high image quality.

SUMMARY OF THE INVENTION

The present invention has been made to solve the above problems, and has as its object to search for a plurality of objects obtained by segmenting a single image.

In order to achieve the above object, a preferred embodiment of the present invention discloses (claim 1).

It is another object of the present invention to determine correction characteristics of the single image on the basis of the characteristics of the segmented objects when the segmented objects are found.

In order to achieve the above object, a preferred embodiment of the present invention discloses (claim 1+2).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 shows the default state of an identification table;

FIG. 7 shows an example of the state of the identification table;

FIG. 9 shows an example of the state of the identification table;

FIG. 10 shows an example of the state of the identification memory; and

DESCRIPTION OF THE PREFERRED EMBODIMENTS

An image processing apparatus according to a preferred embodiment of the present invention will be described in detail hereinafter with reference to the accompanying drawings.

Figure 1:
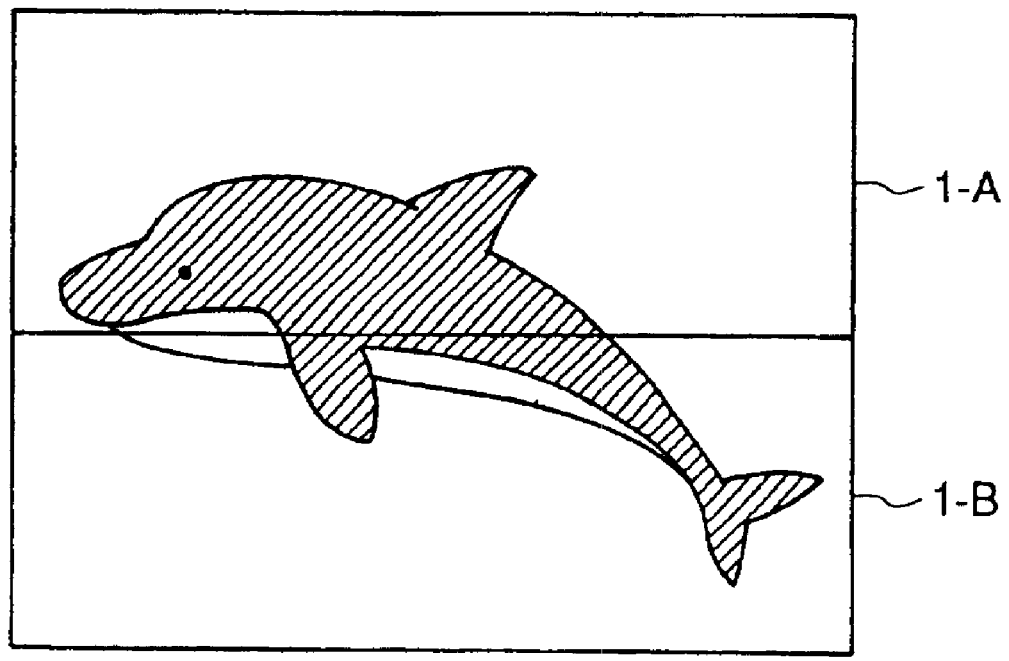
FIG. 1 is a view for explaining an example of an image segmented into two image rendering commands.
Figure 2:
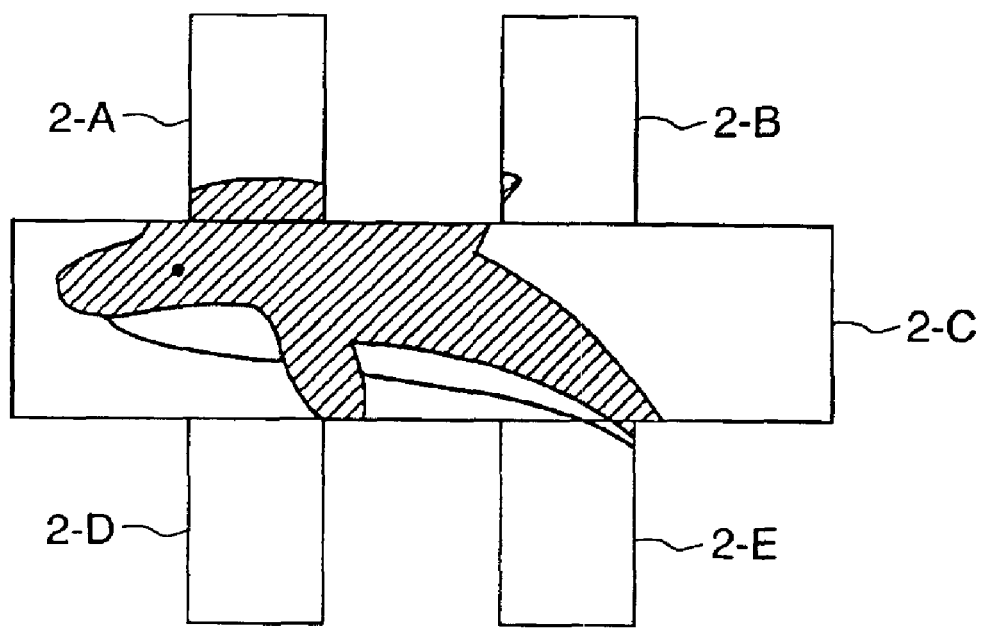
FIG. 2 is a view for explaining an example of an image segmented into a plurality of image rendering commands.
Figure 3:
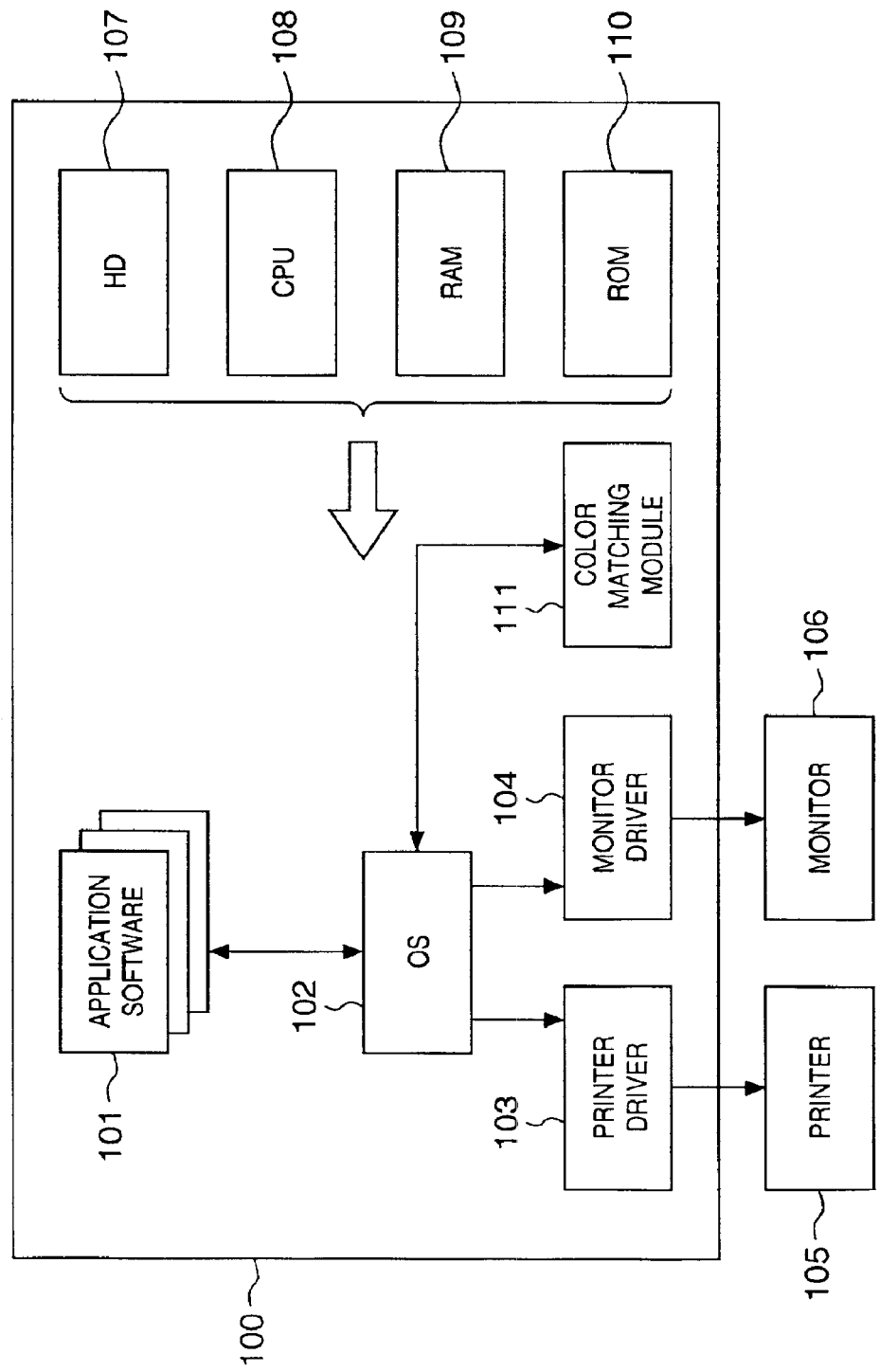
FIG. 3 is a block diagram showing the arrangement of an image processing apparatus according to an embodiment of the present invention.

FIG. 3 is a block diagram showing the arrangement of an image processing apparatus of this embodiment.

A printer 105 such as an ink-jet printer or the like, and a monitor 106 are connected to a host computer 100.

The host computer 100 has application software 101 such as a wordprocessor, spreadsheet, internet browser, and the like. Various rendering commands (image rendering command, text rendering command, and graphics rendering command) which are issued by the application software 101 and represent an output image are input to a monitor driver 104 via an operating system (OS) 102. Upon executing a print process, these rendering commands are also input to a printer driver 103 via the OS 102. Each of the printer driver 103 and monitor driver 104 is software which processes these rendering commands to generate print data to be printed by the printer 105 or to display an image on the monitor 106.

The host computer 100 comprises hardware components such as a CPU 108, hard disk (HD) 107, RAM 109, ROM 110, and the like so as to store the aforementioned software and make it function. Note that a prevalently used IBM AT compatible personal computer may be used as the host computer 100 shown in FIG. 3, and Windows®95 of Microsoft Corp. may be used as the OS 102. A system in which arbitrary application software having a print function is installed in such personal computer and the monitor 106 and printer 105 are connected to the personal computer is plausible.

The host computer 100 generates output image data using text data categorized into text such as characters and the like, graphics data categorized into graphics such as figures, and the like, image data categorized into photo images and the like, and so forth, on the basis of an image displayed on the monitor 106. Upon printing an image based on the output image data, the application software 101 sends a print output request to the OS 102, and issues rendering commands including a text rendering command which defines the text data, a graphics rendering command which defines graphics data, and an image rendering command which defines image data.

Upon receiving the print output request from the application software 101, the OS 102 passes the rendering commands to the printer driver 103 corresponding to the printer 105. The printer driver 103 processes the print output request and rendering commands passed from the OS 102 so as to generate print data that the printer 105 can print, and sends the print data to the printer 105. When the printer 105 is a raster printer, the printer driver 103 rasterizes the rendering commands on R, G, and B page memories each having a 24-bit depth. After all the rendering commands are rasterized, the printer driver 103 converts the contents of the page memories into a data format that the printer 105 can print, e.g., C, M, Y, and K data, and sends these data to the printer 105. Note that the page memories are assured on the RAM 109.

The flow of the process by the printer driver 103 of this embodiment will be explained below with reference to FIGS. 4 to 11.

Figure 4:
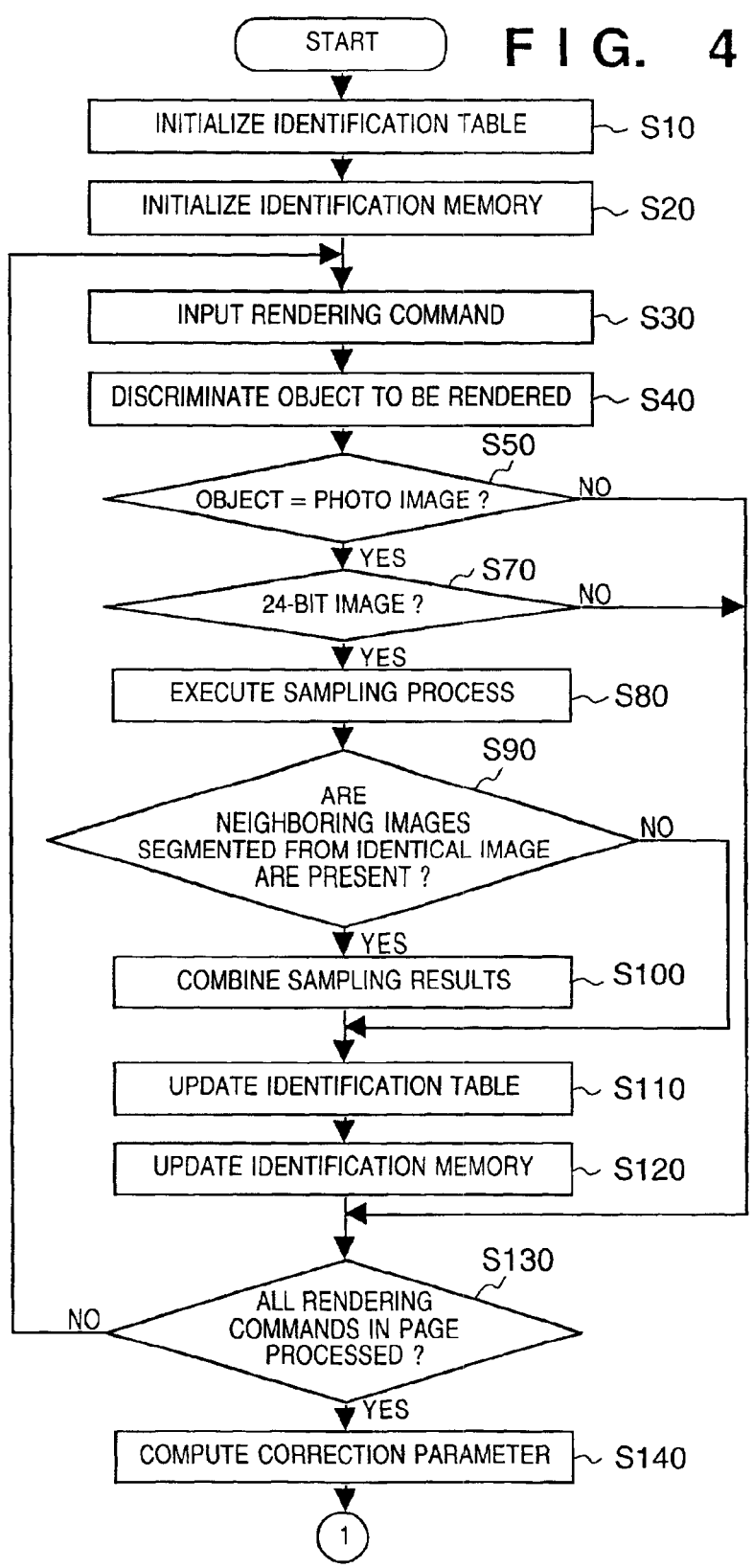
FIG. 4 is a flow chart showing the process executed by a printer driver shown in FIG. 3.
Figure 11:
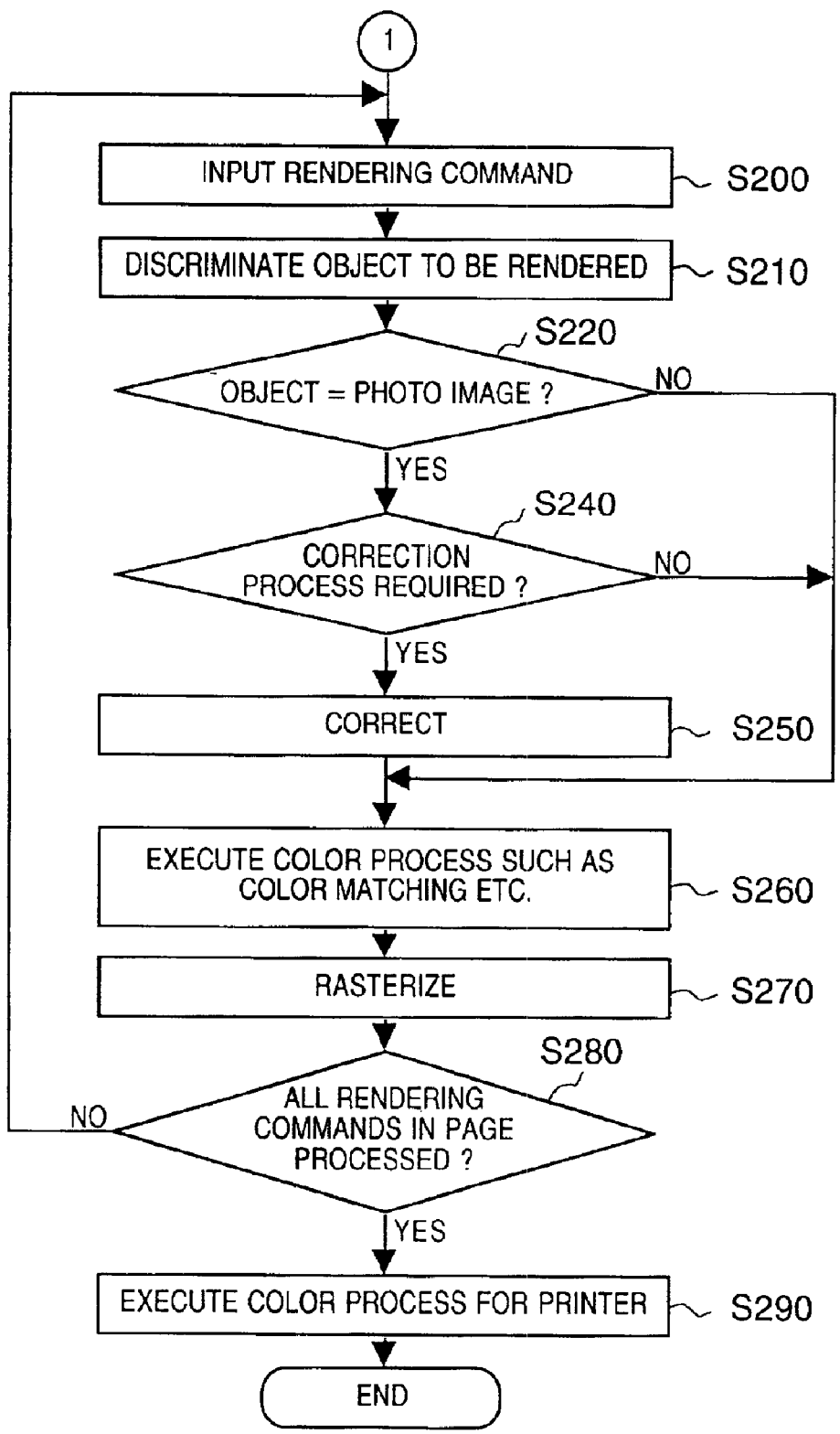
FIG. 11 is a flow chart showing the process executed by the printer driver shown in FIG. 3.

The printer driver 103 requests of the application software 101 or OS 102 print data (rendering commands) that form an image of a page to be printed twice. In response to the first and second requests, the application software 101 issues a set of all rendering commands required for outputting the page. FIG. 4 shows the flow for processing print data issued in response to the first request, and FIG. 11 shows the flow for processing print data issued in response to the second request. In the processing flow of print data show in FIG. 4, print data is interpreted to acquire information required for an image correction process, thus preparing for execution of the image correction process. In the processing flow of print data shown in FIG. 11, only a portion of the image rendering command that requires the image correction process undergoes the image correction process using the prepared image correction process, a color matching correction process, and the rendering commands are rasterized on the page memories to generate print data, which is transferred to the printer 105.

The process of print data issued in response to the first request shown in FIG. 4 will be explained.

An identification table used to discriminate segmented images is initialized in step S10, and an identification memory for storing the rendering positions of images to discriminate segmented images is initialized in step S20. One rendering command is received in step S30, and is interpreted in step S40 to discriminate the type of object indicated by that rendering command.

If the rendering command of interest is not an image rendering command, i.e., it is a text rendering command, graphics rendering command, or the like, it is determined in step S50 that the object is not a photo image, and the flow jumps to step S130. On the other hand, if the rendering command is an image rendering command, it is determined that the object is a photo image, and the flow advances to step S70.

Since the image correction process to which this embodiment is applied corrects white balance or color balance disturbed under the influence of an image sensing condition or the like, the object to be corrected is a photo image. In general, most photo images are 24-bit RGB objects. An image having a bit depth smaller than 24 bits, e.g., an 8-bit pallet is not appropriate as the object to be corrected. For this reason, the header of the image rendering command is referred to in step S70, and only when the bit depth is 24 bits or more, the flow advances to step S80; otherwise, it is determined that the rendering command of interest is not an object which can be corrected and the flow jumps to step S130.

In case of at least 24-bit image object, the contents (e.g., pixel values) of the object passed in the form of the image rendering command are sampled in step S80, and it is checked in step S90 by the following method if a neighboring (or overlapping) image obtained by breaking up an identical image is present.

Figure 6:
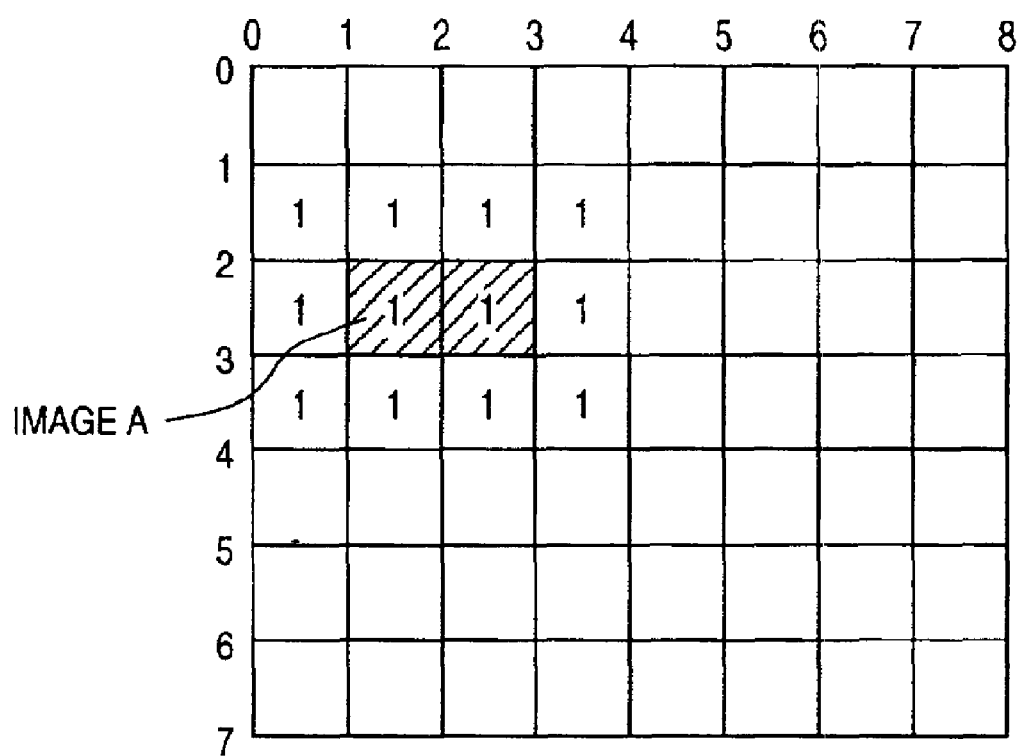
FIG. 6 shows an example of the state of an identification memory.

When Image A is rendered on a rectangular region having coordinates (1, 2) and (3, 3) as diagonal apexes in accordance with the first image rendering command of a given page, as shown in FIG. 6, information indicating that Image A is rendered on that rectangular region and neighboring region is written in the identification memory. As the value of the information to be written, the identification table shown in FIG. 5 is looked up, and a minimum value of identification numbers with use flags=FALSE is written. In case of FIG. 5, "1" is written. After the identification number is written in the identification memory, the identification table is updated, as shown in FIG. 7.

When Image B is rendered on a rectangular region having coordinates (5, 2) and (7, 3) as diagonal apexes in accordance with the second image rendering command, since no identification number corresponding to another image rendering command is written in that region, it is determined that no neighboring image obtained by breaking up an identical image is present for Image B.

Furthermore, when Image C is rendered on a rectangular region having coordinates (0, 3) and (8, 4) as diagonal apexes in accordance with the third image rendering command, the identification numbers corresponding to the image rendering commands of Images A and B have already been rewritten in that region. Hence, since these numbers indicate the presence of images which neighbor or overlap Image C, it is determined that neighboring Images A and B obtained by breaking an identical image are present for Image C.

If it is determined in step S90 that a neighboring (or overlapping) image obtained by breaking up an identical image is present, the sampling results of these images in step S80 are combined in step S100.

Figure 8:
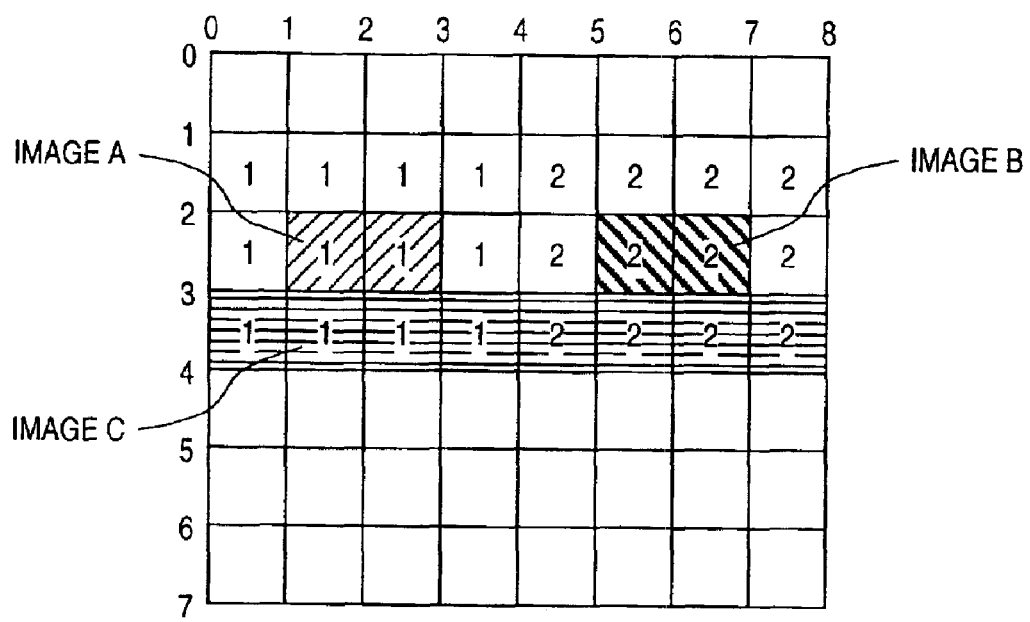
FIG. 8 shows an example of the state of the identification memory.
Figure 10:
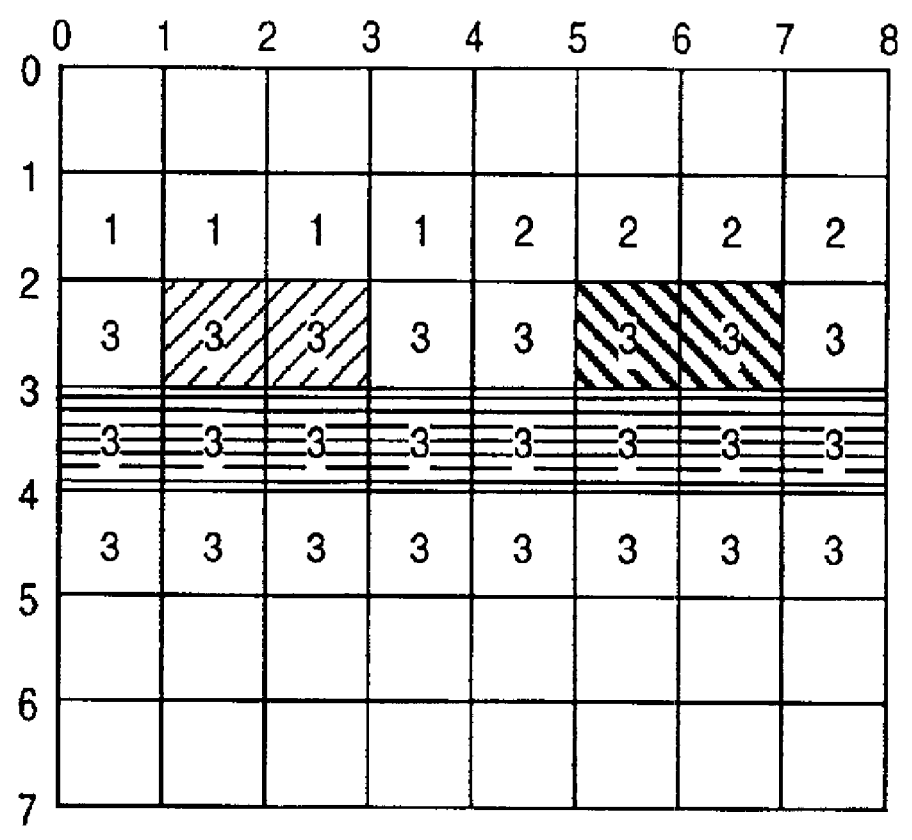

In step S110, the identification numbers are written in the identification table as addresses indicating the correction information regions that save the sampling results, as shown in FIGS. 7 and 9. In case of FIG. 9, since it is determined that all Images A, B, and C can be combined, the correction information region addresses for Images A and B are updated so that all the three images indicate identical correction information regions, when the image rendering command corresponding to Image C is processed. In step S120, the identification number is written in the identification memory, as shown in FIGS. 6, 8, and 10.

The processes in steps S30 to S130 repeat themselves until it is determined in step S130 that the processes in steps S30 to S120 are complete for all rendering commands in the page. Upon completion of the processes for all print data (rendering commands), the flow advances to step S140. In step S140, a correction parameter used in the image correction process, e.g., a gamma correction parameter or the like based on the color distribution or luminance information is computed on the basis of the correction information region addresses saved in the identification table, and the computed correction parameter is temporarily stored in, e.g., the RAM 109 in correspondence with the correction information region addresses.

In this manner, the process of print data issued in response to the first request is completed, and the printer driver 103 issues the second request.

Subsequently, the process of print data issued in response to the second request shown in FIG. 11 will be explained below.

One rendering command is received in step S200, and is interpreted in step S210 to discriminate the type of object indicated by the rendering command. If the rendering command of interest is not an image rendering command, i.e., it is a text rendering command, graphics rendering command, or the like, it is determined in step S220 that the object is not a photo image, and the flow jumps to step S260. On the other hand, if the rendering command is an image rendering command, it is determined that the object is a photo image, and the flow advances to step S240.

It is checked based on information temporarily stored in steps S110 and S120 in step S240 if the correction process for the received image rendering command is required. If it is determined that no correction process is required, the flow jumps to step S260. If it is determined that the correction process is required, the object which is requested to be rendered by the image rendering command undergoes the image correction process using the correction parameter temporarily stored in step S140 (step S250). Whether or not the correction process is required can be determined by checking if the identification number is written in an area of the identification memory corresponding to the rendering region, and the correction parameter to be used can be easily determined based on the corresponding correction information region address.

In step S260, a color matching module 111 shown in FIG. 3 executes a color process such as a color matching process in correspondence with the type of object. In step S270, an object is rasterized on the page memories on the basis of the rendering command. Note that the object of the photo image that has undergone the image correction process in step S250 undergoes a "tincture priority" color matching process suitable for the photo image.

The processes in steps S200 to S270 repeat themselves until it is determined in step S280 that the processes in steps S200 to S270 are complete for all rendering commands in the page. Upon completion of the processes for all print data (rendering commands), the flow advances to step S290. In step S290, the print image data rasterized on the page memories undergoes a color process for the printer, a process for converting R, G, and B data into C, M, Y, and K data, a gamut process corresponding to the color reproducibility of the printer 105, and the like, thus converting the data into image data that can be output to the printer 105. In step S300, the image data processed to be suitable for the printer is sent to the printer 105. In a normal raster printer, image data is compressed in units of lines, and the compressed line data are packed into a simple command, which is to be transferred to the printer.

In the above embodiment, a scheme (unbanding scheme) for assuring the identification memory for one page, which records the rendering positions of images so as to determine images obtained by breaking up an identical image, has been explained. Alternatively, a scheme (banding scheme) for assuring an identification memory corresponding to a segmented region may be used without assuring the identification memory for one page, by breaking up one page into a plurality of regions.

In the above example, the print data request is issued twice. Alternatively, rendering commands obtained by the first request may be stored, and the process shown in FIG. 11 may be executed using the stored rendering commands.

In the above embodiment, a printer driver which processes raster data has been exemplified as the printer driver 103. Also, the embodiment of the present invention can be applied to a printer driver corresponding to a page description language such as PostScript® of Adobe Systems Incorporated.

Furthermore, the user may manually set using the user interface of the printer driver 103 whether to execute the image correction process or not.

As described above, according to this embodiment, whether or not image rendering commands can be combined can be determined even for images which are complicatedly broken up by application software to render a cut image, as long as these images are located at neighboring positions. In this manner, when an object of a given type included in an input image is to undergo an image correction process in correspondence with the color distribution or the like, an identical image correction process can be done irrespective of the segmented shapes of images, thus obtaining a high-quality image output.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   an input unit, arranged to input a rendering command;
   a discriminator, arranged to discriminate a type of object to be rendered on the basis of the rendering command inputted by said input unit;
   a first determiner, arranged to determine whether or not the object is to be subjected to a correction process, in accordance with the result discriminated by said discriminator; and
   a second determiner, arranged to determine whether the object which is determined to be subjected to the correction process by said first determiner is an object segmented from an image or not by examining a rendering region of the object and neighboring regions thereof.

2. An apparatus according to claim 1, further comprising a decision unit, arranged to decide a correction characteristic of the correction process on the basis of a characteristic of the object when it is determined by said second determiner that the object is an object segmented from an image.

3. An apparatus according to claim 2, further comprising a correction unit, arranged to execute an identical correction process for a plurality of segmented objects that form the image on the basis of the correction characteristic.

4. An apparatus according to claim 1, wherein said second determiner determines whether the object is an object segmented from an image or not on the basis of a rendering position of the object indicated by the rendering command.

5. An apparatus according to claim 1, wherein said second determiner has a memory for recording identification information indicating the presence of candidates of the segmented object in correspondence with the rendering region of the object and the neighboring regions thereof.

6. An apparatus according to claim 5, wherein said second determiner determines that the segmented object is present when the identification information which neighbors or overlaps the rendering region of the object indicated by the rendering command to be processed is present.

7. An apparatus according to claim 2, wherein said decision unit comprises an extractor arranged to extract a color or luminance distribution of the object which is determined by said first determiner to be subjected to the correction process.

8. An apparatus according to claim 7, wherein said decision unit decides the correction characteristic by combining pieces of the color or luminance distribution information extracted from a plurality of segmented objects that form the image.

9. An image processing method comprising the steps of:
   inputting a rendering command;
   discriminating a type of object to be rendered on the basis of the rendering command;
   determining whether or not the object is to be subjected to a correction process, in accordance with the discrimination result in said discriminating step; and
   determining whether the object which is determined to be subjected to the correction process in said first determining step is an object segmented from an image or not by examining a rendering region of the object and neighboring regions thereof.

10. A method according to claim 9, further comprising the step of deciding a correction characteristic of the correction process on the basis of a characteristic of the object when it is determined in said second determining step that the object is an object segmented from an image.

11. A method according to claim 10, further comprising the step of executing an identical correction process for a plurality of segmented objects that form the image on the basis of the correction characteristic.

12. A method according to claim 9, wherein said second determining step includes determining whether the object is an object segmented from an image or not on the basis of a rendering position of the object indicated by the rendering command.

13. A method according to claim 12, further comprising the step of storing identification information indicating the presence of candidates of the segmented object in a memory in correspondence with the rendering region of the object and the neighboring regions thereof.

14. A method according to claim 13, wherein said second determining step includes determining that the segmented object is present when the identification information which neighbors or overlaps the rendering region of the object indicated by the rendering command to be processed is present.

15. A method according to claim 10, wherein said deciding step includes determining the correction characteristic on the basis of a color or luminance distribution of the object which is determined to be subjected to the correction process.

16. A method according to claim 15, wherein the correction characteristic of a plurality of segmented objects that form the image is decided by combining pieces of the color or luminance distribution information extracted from those segmented objects.

17. A computer program product comprising a computer readable medium having a computer program code, for an image processing method, comprising process procedure codes for:
   inputting a rendering command;
   discriminating a type of object to be rendered on the basis of the rendering command;
   determining whether or not the object is to be subjected to a correction process, in accordance with the discrimination result in said discriminating step; and
   determining whether the object which is determined to be subjected to the correction process in the first determining step is an object segmented from an image or not by examining a rendering region of the object and neighboring regions thereof.

18. A product according to claim 17, further comprising process procedure code for deciding a correction characteristic of the correction process on the basis of a characteristic of the object when it is determined in said second determining step that the object is an object segmented from an image.

* * * * *